United States Patent [19]
Hubert

[11] 4,355,313
[45] Oct. 19, 1982

[54] SATELLITE ANTENNA ORIENTATION CONTROL METHOD AND SENSOR CONFIGURATION APPLYING SAID METHOD

[75] Inventor: Bernard Hubert, Le Cannet, France

[73] Assignee: Societe Nationale Industrielle Aerospatiale, Paris, France

[21] Appl. No.: 160,810

[22] Filed: Jun. 18, 1980

[30] Foreign Application Priority Data

Jun. 18, 1979 [FR] France .................. 79 15593

[51] Int. Cl.³ ............................................. H01Q 1/28
[52] U.S. Cl. ........................... 343/725; 343/100 ST; 343/781 P; 343/DIG. 2
[58] Field of Search ............... 343/6 ND, 725, 781 P, 343/854, DIG. 2, 100 ST

[56] References Cited

U.S. PATENT DOCUMENTS

| | | | |
|---|---|---|---|
| 3,025,515 | 3/1962 | Fairbanks | 343/761 |
| 3,169,245 | 2/1965 | Cutler | 343/18 R |
| 3,242,485 | 3/1966 | Astheimer | 343/6 ND |
| 3,341,151 | 9/1967 | Kampinsky | 343/DIG. 2 |
| 3,434,142 | 3/1969 | Andre et al. | 343/100 R |
| 3,714,434 | 1/1973 | Mears et al. | 244/158 R |

FOREIGN PATENT DOCUMENTS

2302789 1/1974 Fed. Rep. of Germany .
2166972 4/1977 Fed. Rep. of Germany ... 343/DIG. 2

*Primary Examiner*—Eli Lieberman
*Attorney, Agent, or Firm*—Karl W. Flocks; A. Fred Starobin

[57] ABSTRACT

The present invention relates to the orientation of antennae on a satellite possessing at least one antenna comprising a horn rigidly connected to the body of the satellite, a movable reflector mounted on an orientable platform and at least one radio-frequency sensor in the horn using said antenna to control the orientation of said reflector. The invention consists of: using a signal characterizing the pivoting of the orientable platform with respect to the body of the satellite to orient said satellite correctly with respect to the reflector in order to limit the pivoting of said platform; using the signals from at least one earth sensor in the same way as the signals from the radio-frequency sensor to control said reflector, so as to orient the beam towards the point sighted on the earth. The invention is particularly useful for the control of the orientation of antennae, particularly on a satellite.

11 Claims, 8 Drawing Figures

SATELLITE ANTENNA ORIENTATION CONTROL METHOD AND SENSOR CONFIGURATION APPLYING SAID METHOD

BACKGROUND AND GENERAL DESCRIPTION OF THE INVENTION

The present invention relates to the orientation of antennae on a satellite. It relates to antenna composed of a horn member fixed to the body of the satellite and mounted generally on a tower and a movable reflector, mounted on the body of the satellite, through an orientable platform, for example, as the orientable platform apparatus described by Hubert et al. in their U.S. patent application Ser. No. 125,058 filed on Feb. 27, 1980. This is now U.S. Pat. No. 4,325,586 issued Apr. 20, 1982.

To orient such an antenna with good accuracy, recourse is generally had to a radio-frequency sensor which delivers an error signal proportional to the sighting deviation relative to an earth beacon. This signal can be used to control the orientable platform as, for example, explained in the aforesaid U.S. patent application. The considerable advantage of the radio-frequency sensor is to use a beam which follows an electromagnetic path as close as possible to that which is followed by the beam of the mission. In particular, the antenna being a deformable assembly, the horn plus the reflector, it is essential for the sensor to use the reflection on a surface connected to the reflector. A drawback of the radio-frequency sensor is its complexity which is manifested by a rather low reliability. One solution could be to double or even to triple the corresponding electronic systems but an increase in weight would result therefrom.

Infra-red earth sensors, usually two in number for reasons of reliability on geostationary satellites, sight the center of the earth seen from the satellite. They are used for the acquisition of the earth and for the stabilization of the satellite in geosynchronous orbit.

The body of the satellite with one or two or several inertia wheels or reaction wheels according to conventional arrangements may be stabilized toward the center of the earth by means of signals from the earth sensor and the movable antenna can be mounted on this satellite through an orientable platform controlled, independently, toward any point on the earth constituted by a beacon, by means of signals from the radio-frequency sensor.

When the satellite is redirected with respect to the earth by an angle $\theta$ along one axis, the platform of the antenna pivots substantially by $\theta/2$ with respect to the satellite to ensure the sighting of the beam cancelling the error signal of the radio-frequency sensor.

It is an object of the present invention to control the body of the satellite itself to limit the deflections of the platform and to use, as an error signal to control the body of the satellite, any signal characterizing the pivoting of the platform about two axes.

The control current of the pivoting of the orientable platform which may be substantially proportional to the pivoting angle of the platform, as explained in the aforesaid U.S. patent application, is utilized to this end.

The platform, used to detect the position of the satellite in space, is hence in accordance with the invention, considered as a particularly simple and reliable sensor.

More precisely, according to the present invention a method is provided to control the orientation of an antenna on a satellite possessing at least one antenna comprising a horn rigidly connected to the body of the satellite, a movable reflector mounted on an orientable platform and at least one radio-frequency sensor using this antenna to control the orientation of said reflector, characterized in that is consists of:

using a signal characterizing the pivoting of the orientable platform with respect to the body of the satellite to orient said satellite correctly with respect to the reflector, in order to limit the pivoting of said orientable platform, and using the signals from at least one earth sensor in the same way as the signals of the radio-frequency sensor to control said reflector, so as to orient the beam toward the point sighted on the earth.

According to another aspect of the invention, a configuration of sensors is provided on a satellite, applying the above method and enabling the use of the infra-red earth detector in redundancy to the radio-frequency sensor to control the antenna whilst the body of the satellite is controlled only with the position signal of the platform, itself orientable with respect to the satellite.

Other characteristics and advantages of the present invention will emerge from the description which follows given with reference to the accompanying drawings.

DESCRIPTION OF PREFERRED EMBODIMENTS

The general configuration to which the present invention is applied comprises, on the one hand, an electronic system E.S. controlling the body of a satellite S connected with jets J and at least one kinetic wheel K, and, on the other hand an electronic system E.P. for controlling an orientable platform P carrying an antenna A. Such electronic systems ES and EP for orientable bodies are described in the aforementioned patent application. The present invention obtains and uses the signals to operate those electronic systems.

The electronic system E.S. for controlling the body of the satellite normally receives a signal S1 for stabilizing said body toward the center C of the earth T, which signal is delivered from an infrared earth sensor IR which sights the center of the earth, viewed from the satellite. Depending on the signal $S_1$ such system generates orders acting upon the nozzles J and one or several inertial wheels K so as to correct the satellite attitude.

The electronic control system E.P of the platform normally receives an error signal S2 proportional to the deviation of sighting with respect to a beacon B on the ground on earth which signal is delivered by a radio-frequency sensor R.F. Depending on the signal $S_2$, such system generates a current i which is forwarded into the motors of platform P, thereby permitting to correct the orientation thereof, the action of the motors being exerted in respect to the satellite S.

According to the invention the signal S1 of the sensor IR is also delivered to the electronic control system EP for the orientable (by pivoting about a point O along two axes) platform and the control current i of the position of the platform is also delivered to the electronic system ES for controlling the body of the satellite, the sensor IR being used in redundancy to the sensor RF to control the antenna A and the platform P being itself considered as a detector in itself to detect the position of the satellite in space.

It must be noted that, in the new configuration of sensors on the satellite according to the invention, the antenna is controlled by closed loop to a point on the earth defined by the beacon B of the radio-frequency sensor RF and the satellite is controlled only to limit the fluctuations in pivoting of the orientable platform P along two axes, to values selected according to the mission. For example, the body of the satellite could be allowed to reach movements of amplitude 0.3° to 0.5° or quite another value, before the control of the satellite comes into play; this relates to control within a limited cycle.

The novel configuration of sensors according to the invention on a satellite offers several possibilities for back-up modes to overcome a large number of failures.

Figure 2:
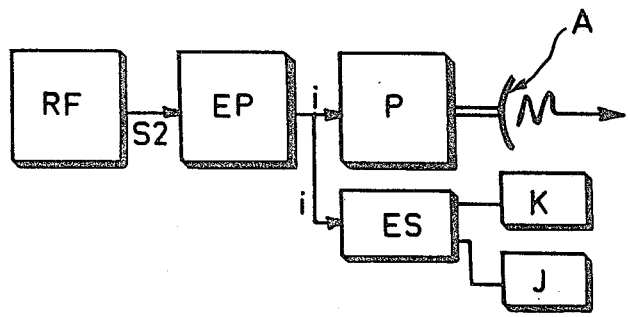
FIGS. 2 to 5 are similar diagrams showing possible back-up modes, offered by the invention.

Operational methods in operation in a geostationary orbit are considered below:

In the case of a failure (FIG. 2) of the infra-red sensor IR, the control current i of the position of the platform P which is substantially proportional to the angle of pivoting of this platform, is used as an error signal to control the body of the satellite S.

Figure 3:
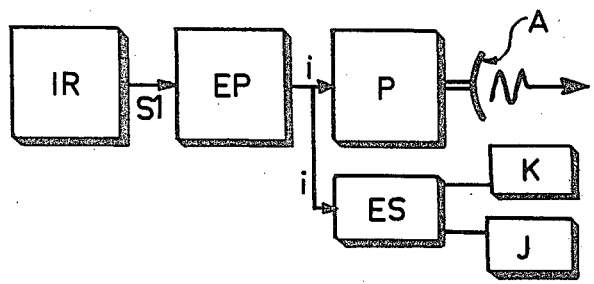

In the case of a failure (FIG. 3) of radio-frequency sensor RF, the control current i of the position of the platform P which is substantially proportional to the pivoting angle of this platform, is used as an error signal to control the body of the satellite S.

These first two methods of operation (FIGS. 2 and 3) enable an accuracy of sighting to be reached in accordance with current specifications.

Figure 4:
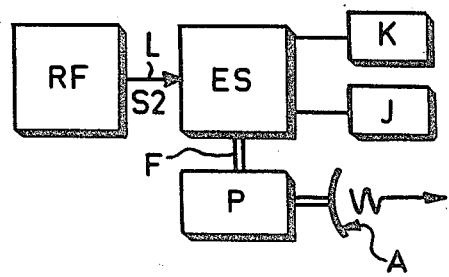
Figure 5:
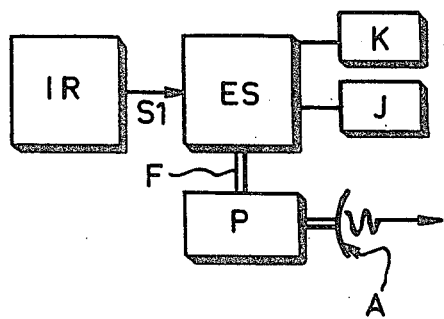

In FIGS. 4 and 5, the reference F indicating a double line symbolizes a failure of the orientable platform which becomes rigidly connected to the body of the satellite.

Figure 1:
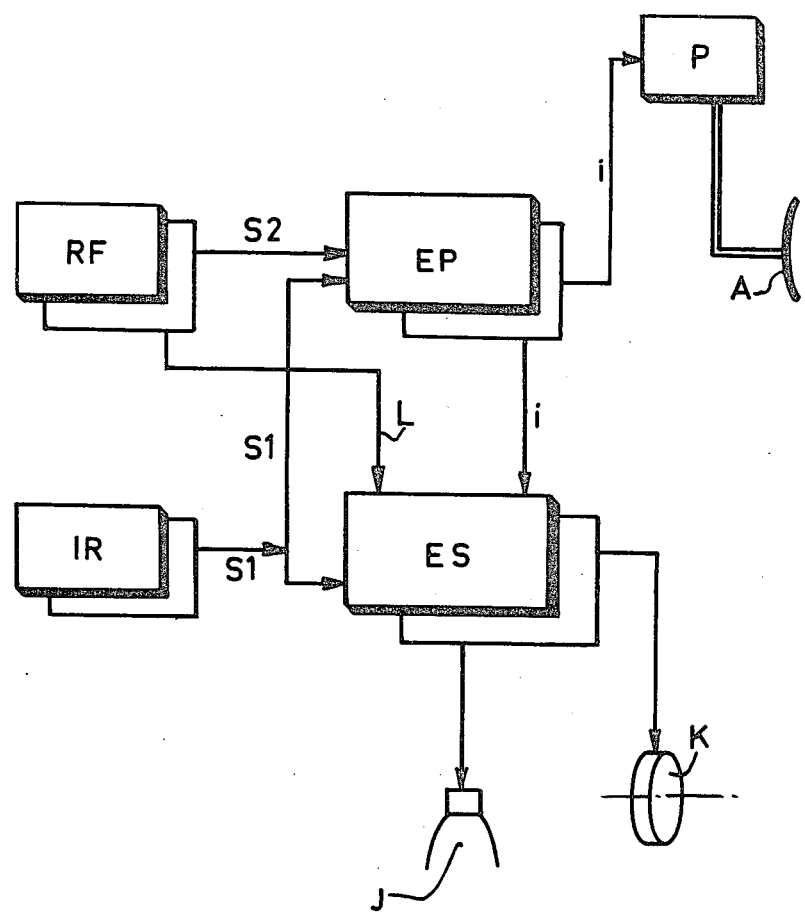
FIG. 1 is a representative diagram of the method according to the invention of controlling the orientation of an antenna on a satellite.

In the case of a simultaneous failure (FIG. 4) of the orientable platform P in any position and of the infra-red sensor IR, the radio-frequency sensor RF through a link L (FIG. 1) established between this sensor and the electronic system ES again enables control of the body of the satellite S and the reflector blocked in any such position.

In the case of a simultaneous failure (FIG. 5) of the orientable platform P in any position and of the radio-frequency sensor RF, the earth sensor IR can again be used to control the body of the satellite S and the reflector blocked in any such position.

The accuracy, of course, diminishes but the beam is in fact oriented in the desired direction.

The radio-frequency reflection is effected on a parabolic reflector 1 mounted on a mobile part 2 of the platform P, the radio-frequency sensor RF being arranged on a tower 3 fixed to the body of the satellite.

The infrared reflection is effected on the movable part 2 supporting the reflector 1 and the infrared sensor IR sights the center C of the earth viewed from the satellite, the optical path of the image of the earth being selected as close as possible to that of the beam to be aimed.

The one or more earth sensors preserve their own roles during the transfer orbit and the drift orbit as well as for the acquisition of the earth and as applicable the reacquisitions in the geostationary orbit.

Various embodiments are explained below, within the scope of the present invention, to obtain these two types of reflection on the same movable part 2.

Figure 6:
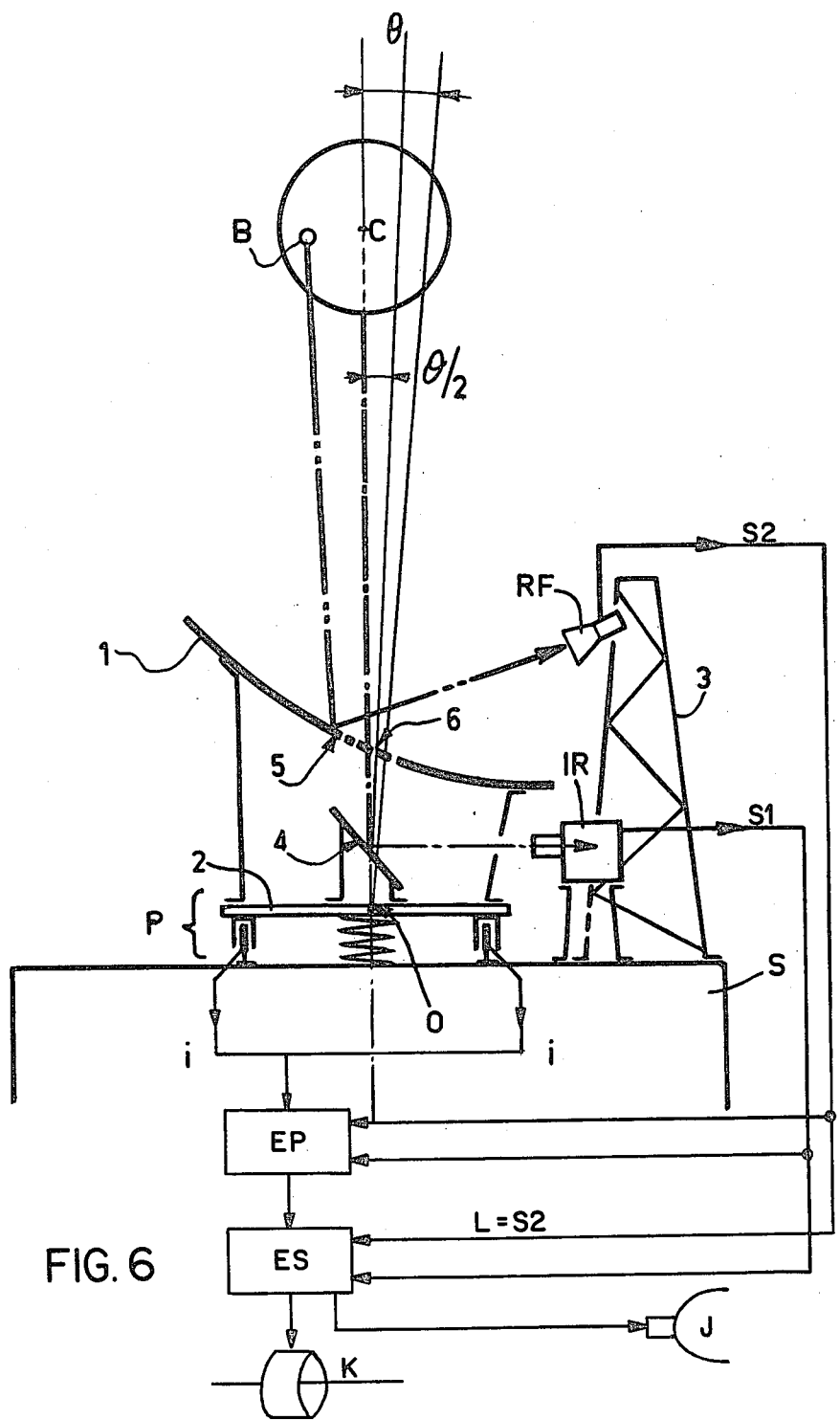
FIGS. 6 to 8 show three different embodiments of sensor configurations on a satellite employing the method according to the invention.

In the embodiment of FIG. 6, a mirror 4 fastened to the movable part 2 of the orientable platform is located beneath the reflector 1. A hole 5 is formed in the reflector and the earth sensor IR is restrained in position on the body of the satellite, either directly on the upper platform, or on the tower 3 so that the image of the earth becomes shaped on the sensor. The sizes of the hole and of the mirror are compatible with the maximum anticipated deflections.

The hole 5 in the reflector 1 is filled by a grid 6 whose electricity conductive mesh is a function of the wavelength used, for example ⅛ or 1/16 according to the losses that can be accepted, and so selected of a size so that radio waves are reflected and infra-red radiations pass therethrough.

The distance between these two families of wavelengths is sufficiently large so that a meshing as a screen for RF waves does not constitute an obstacle for IR waves. The meshing technique has been applied for a long time to radio-electric reflectors (radars, radio-telescopes) and is within the knowledge of the man of the art. Such a grid 6 is formed as a sieve of no substantial thickness with meshes of the order, for instance, of one millimeter for a wave length of one centimeter. The meshes can be of any shape, such as, for exampale, quadrangular or hexagonal or other shape.

The thermal control of this grid is also carefully designed.

Figure 7:
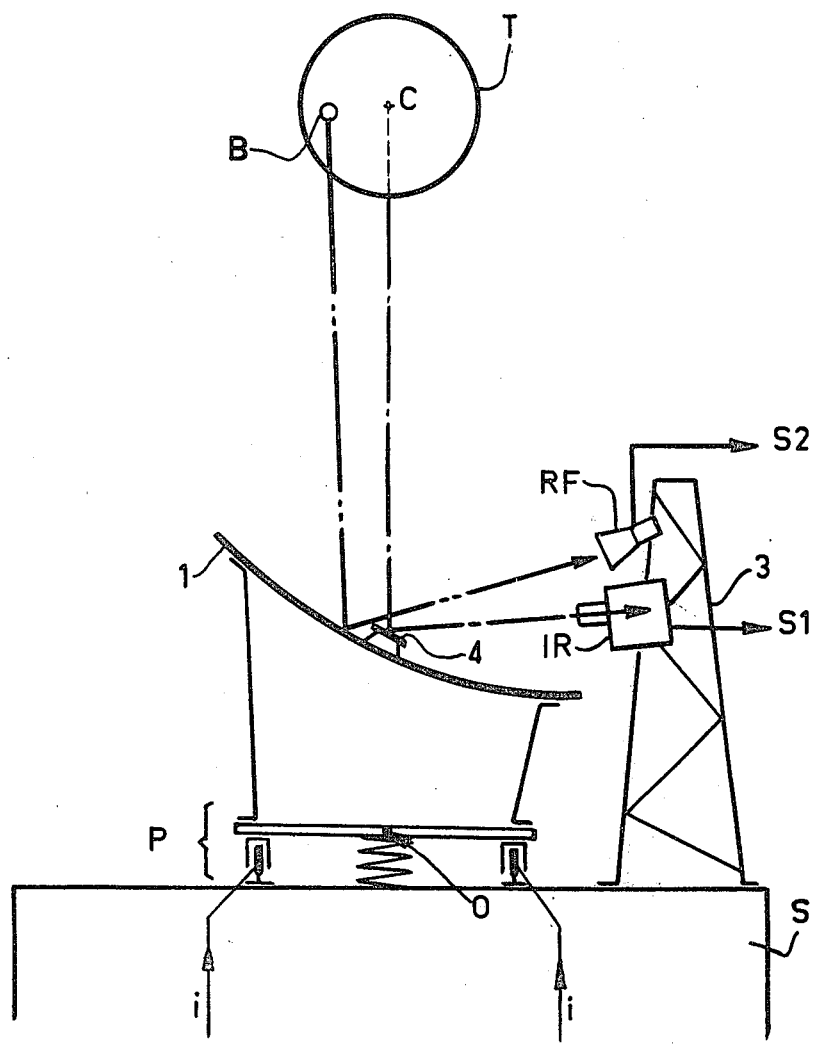

In the embodiment of FIG. 7, the mirror 4 is arranged in the reflector 1 and sends back the image of the earth to the sensor IR mounted on the tower 3 closer to the horn RF than in the preceding solution. The principle is the same and in this way the making of the hole in the reflector is avoided. There may, however, result in a slight disturbance in the reflection of the radio-electrical beams.

Figure 8:
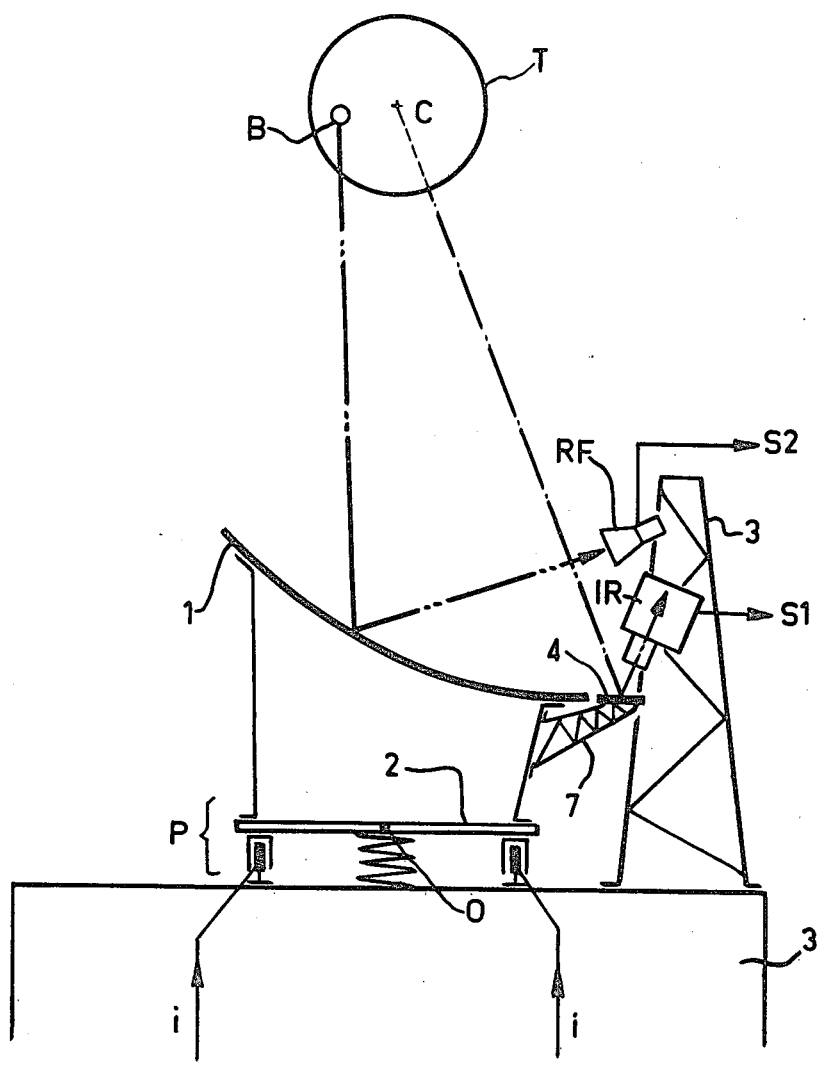

In the embodiment of FIG. 8, the mirror 4 is connected by a support arm 7 to the movable part 2 of the orientable platform P and offset outside the reflector 1. This arrangement has the advantage of reducing the disturbances of the radio-electrical beams. On the other hand, the mass is increased and it is possible to experience thermal deformations of the support arm which can reduce accuracy.

In the case where several antennae coexist, each having its orientable platform on the same satellite, the contol of the body of the satellite takes into account, of course, movements of all of the orientable platforms to decide when the threshold is reached and the moment when the control of the body of the satellite must come into play to reduce these movements. The complexity is only apparent since the rotations of the orientable platform, due to the rotation of the body of the satellite in space, are all substantially identical to the approximation of alignment errors. The first orientable platform reaching the maximum deviation selected can thus trigger the actuation of the control of the body of the satellite; or also the platform accommodating the return mirror for the earth image to the earth sensor.

The invention relates generally to the detection of error or position deviation signals and it is thus compatible with any system, device or principle for controlling a satellite in a geosynchronous orbit using roll and pitch error signals. The control current i is an analog signal which is used directly for the control of the satellite. If the axes of the antenna and/or of the platform do not correspond to the roll and pitch axes of the satellite, a usual resolver can permit the combination of the error signals necessary to carry out the change in axis to be ensured.

Before the orientable platform is unblocked, the earth sensor IR operates quite normally, it views the earth and can hence be used, as normally in transfer orbit to control the satellites. In the same way, it may be used also quite normally for earth acquisition.

On the other hand, when in normal operation in synchronous orbit, the pointing error signal delivered by the earth sensor IR is used in the same way as that of the radio-frequency sensor RF to control the reflector and to ensure the aiming of the beam. It must be noted that if the radio-frequency sensor delivers an error signal with respect to the aiming in the direction of the beacon B which is close, if not merged with the central direction of the beam, the earth sensor gives a less favorable indication since it gives the errors with respect to the center of the earth disk viewed from the satellite. There is, hence, between these two directions, a constant angle, initially known, and which is taken into account in the relative alignment of the equipment during the operations of integration of the satellite. This angle can, besides, be ajusted at the beginning of the life, by in-flight calibration, that is to say comparison between the telemetry data from the radio-frequency sensor and from the earth sensor. The error signals delivered by the earth sensor are then corrected, before use, by a certain value which is stored on board in the memory by telecommand. Even if the measurement accuracies at the level of the sensors alone were comparable, the sighting obtained with the infrared sensor would be less accurate; since the sighting of the beam is affected by an error entailed by a deviation in position in the orbit and by the effect of yaw, these two types of errors not existing in the case of the use of the radio-frequency sensor.

It is of course understood that the present invention has been described and illustrated only as a preferred example and that equivalents could be introduced into its constituent elements without, however, departing from the scope of the invention which is as defined in the appended claims.

I claim:

1. Method of controlling the orientation of an antenna on a satellite in space comprising the steps of
    sensing a radio frequency signal reflected from a radio frequency reflector which delivers an error signal proportional to the sighting deviation relative to an earth beacon,
    sensing an infra-red signal reflected from an infra-red reflector which sights the center of the earth as seen from the satellite,
    controlling the movements of a pivotable orientable platform on which both said reflectors are mounted for movement in unison through use of at least one of said signals,
    sensing a signal produced by the pivoting of said orientable platform with respect to the body of the satellite to limit the pivoting of said orientable platform,
    controlling the movement of the body of the satellite on which the platform is mounted with at least one of said signals from said radio frequency signal and said infra-red signal, and with a signal relative to the position of the platform oriented in relation to the satellite.

2. The method according to claim 1, further characterized by
    forming the image of the earth on the sensor of the infra-red signal after reflection of the image on said infra-red reflector.

3. The method according to claim 1, further characterized by
    the sensor of the infra-red signal delivering signals characterizing the angular deviation of the sighted axis with respect to the local direction of the earth center.

4. The method according to claim 1, further characterized by
    sensing radio frequency signals through at least one of a plurality of radio frequency sensors and sensing infra-red signals through at least one of a plurality of infra-red sensors.

5. The method according to claim 1, further characterized by
    reducing the pivoting amplitude of the platform and thus controlling the roll and pitch of the satellite by combining signals characterizing the pivoting of the platform along two axes.

6. The method according to claim 1, further characterized by
    locking of the platform in a fixed relationship with the satellite.

7. Means for controlling the orientation of an antenna on a space satellite comprising
    a satellite body,
    an orientable platform mounted on said satellite body,
    radio frequency sensor means and infra-red sensor means connected to said satellite body,
    radio frequency reflectors means and infra-red reflector means mounted on said orientable platform to move together in unison on said platform and positioned to reflect to said radio frequency sensor means and said infra-red sensor means respectively,
    electronic control means to control movement of said platform connected to said platform,
    electronic control means to control movement of said satellite connected to means to move said satellite,
    both said electronic control means electrically connected to both said sensor means,
    means to produce a signal from pivotal movement of said orientable platform connected to feed the signal to said electronic control means which controls movement of said satellite.

8. The control means of claim 7 further characterized by
    said radio frequency reflector means having an aperture therethrough,
    said infra-red reflector means placed behind said aperture in said radio frequency reflector means.

9. The control means of claim 8 further characterized by
    a grid over said aperture in said radio frequency reflector means which grid allows maximum passage of radiation of infra-red wave-lengths and maximum reflection of radio-frequency wave-lengths.

10. The control means of claim 7 further characterized by
    said infra-red reflector means being a mirror mounted on said radio frequency reflector means.

11. The control means of claim 7 further characterized by
    said infra-red reflector means being a mirror connected rigidly to said radio frequency reflector means and offset outside the periphery of said radio frequency reflector means.

* * * * *